US009641825B2

(12) United States Patent
Pelman et al.

(10) Patent No.: US 9,641,825 B2
(45) Date of Patent: May 2, 2017

(54) GATED 3D CAMERA

(71) Applicant: Microsoft International Holdings B.V., Amsterdam (NL)

(72) Inventors: Asaf Pelman, Caesarea (IL); Avner Ishay Sander, Hofit (IL); Giora Yahav, Haifa (IL)

(73) Assignee: MICROSOFT INTERNATIONAL HOLDINGS B.V., Amsterdam (NL)

( * ) Notice: Subject to any disclaimer, the term of this patent is extended or adjusted under 35 U.S.C. 154(b) by 607 days.

(21) Appl. No.: 14/179,411

(22) Filed: Feb. 12, 2014

(65) Prior Publication Data

US 2014/0160254 A1 Jun. 12, 2014

Related U.S. Application Data

(63) Continuation of application No. 12/651,022, filed on Dec. 31, 2009, now Pat. No. 8,681,321.

(Continued)

(51) Int. Cl.
*H04N 13/02* (2006.01)
*G01S 17/89* (2006.01)
(Continued)

(52) U.S. Cl.
CPC ............. *H04N 13/02* (2013.01); *G01S 17/89* (2013.01); *H04N 5/2256* (2013.01);
(Continued)

(58) Field of Classification Search
CPC .... G01S 7/4863; G01S 17/105; G01S 17/107; G01S 17/89; H04N 3/155; H04N 5/2226;
(Continued)

(56) References Cited

U.S. PATENT DOCUMENTS 4,627,620 A 12/1986 Yang
4,630,910 A 12/1986 Ross et al.
(Continued)

FOREIGN PATENT DOCUMENTS

CN 101254344 B 6/2010
DE 10124160 A1 12/2002
(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Luke Ratcliffe
(74) *Attorney, Agent, or Firm* — Vierra Magen Marcus LLP

(57) ABSTRACT

A camera for determining distances to a scene, the camera comprising: a light source comprising a VCSEL controllable to illuminate the scene with a train of pulses of light having a characteristic spectrum; a photosurface; optics for imaging light reflected from the light pulses by the scene on the photosurface; and a shutter operable to gate the photosurface selectively on and off for light in the spectrum.

20 Claims, 8 Drawing Sheets

Related U.S. Application Data

(60) Provisional application No. 61/142,361, filed on Jan. 4, 2009.

(51) Int. Cl.
*H04N 5/225* (2006.01)
*H04N 5/235* (2006.01)
*H04N 5/33* (2006.01)

(52) U.S. Cl.
CPC ......... *H04N 5/2353* (2013.01); *H04N 5/2354* (2013.01); *H04N 5/33* (2013.01); *H04N 13/0207* (2013.01)

(58) Field of Classification Search
CPC ...... H04N 5/2256; H04N 5/361; H04N 5/374; H04N 5/3745; H04N 13/0207; H04N 13/0253
See application file for complete search history.

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,054,891 A | 10/1991 | Higa et al. |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,710 A | 10/1996 | Webb et al. |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,877,851 A | 3/1999 | Stann et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,331,911 B1 | 12/2001 | Manassen et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,736,321 B2 | 5/2004 | Tsikos et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,812,964 B1 | 11/2004 | Tani et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,224,384 B1 | 5/2007 | Iddan et al. |
| 7,227,526 B2 | 6/2007 | Hildreth et al. |

(56) References Cited

U.S. PATENT DOCUMENTS

| | | |
|---|---|---|
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,679 B1 | 7/2009 | Gutierrez |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,681,321 B2 | 3/2014 | Pelman et al. |
| 2003/0169797 A1 | 9/2003 | Aldaz et al. |
| 2004/0013157 A1 | 1/2004 | Deng et al. |
| 2004/0075823 A1 | 4/2004 | Lewis et al. |
| 2006/0232767 A1* | 10/2006 | Wilsey ............... G01J 9/00 356/218 |
| 2006/0244809 A1* | 11/2006 | Kimura ............ G03G 15/04036 347/140 |
| 2007/0091175 A1* | 4/2007 | Iddan ................ G01S 7/4863 348/135 |
| 2007/0121095 A1 | 5/2007 | Lewis |
| 2007/0206959 A1 | 9/2007 | Deng et al. |
| 2008/0007709 A1 | 1/2008 | Bamji et al. |
| 2008/0026838 A1 | 1/2008 | Dunstan et al. |
| 2008/0246759 A1 | 10/2008 | Summers |

FOREIGN PATENT DOCUMENTS

| | | |
|---|---|---|
| EP | 0583061 A2 | 2/1994 |
| EP | 1515541 A2 | 3/2005 |
| EP | 1622200 A1 | 2/2006 |
| FR | 2857756 A1 | 1/2005 |
| JP | 08044490 A1 | 2/1996 |
| JP | H11-508359 A | 7/1999 |
| JP | H11-330631 A | 11/1999 |
| JP | 2002-523889 A | 7/2002 |
| JP | 2002-228750 A | 8/2002 |
| JP | 2005-026875 A | 1/2005 |
| JP | 2005309019 A | 11/2005 |
| JP | 2009-204691 A | 9/2009 |
| JP | 2009-541760 A | 11/2009 |
| RU | 2319158 C2 | 3/2008 |
| WO | 93/10708 A1 | 6/1993 |
| WO | 97/17598 A1 | 5/1997 |
| WO | 99/44698 A1 | 9/1999 |
| WO | 03069278 A1 | 8/2003 |
| WO | 2008/003482 A1 | 1/2008 |
| WO | 2009078002 A1 | 6/2009 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

(56) References Cited

OTHER PUBLICATIONS

Azarbayejani et al., "Visually Controlled Graphics", Jun. 1993, vol. 15, No. 6, IEEE Transactions on Pattern Analysis and Machine Intelligence.
Granieri et al., "Simulating Humans in VR", The British Computer Society, Oct. 1994, Academic Press.
Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
"Simulation and Training", 1994, Division Incorporated.
English Machine-translation of Japanese Publication No. JP08-044490 published on Feb. 16, 1996.
Ringbeck, "A 3D Time of Flight Camera for Object Detection", Optical 3-D Measurement Techniques, Plenary Session 1: Range Imaging I, Jul. 9-12, 2007, 10 pages, ETH Zurich.
Watson, "D36.3 Technical Report #3 on 3D Display Techniques and Potential Applications", Integrated Three-Dimensional Television—Capture, Transmission and Display, TC5 Technical Report 3, Project No. 511568, Project Acronym: 3DTV Jul. 30, 2008, pp. 1-132.
"Shining 3D-Camera", Shining 3D Tech, webpage, retrieved May 25, 2010, Hangzhou, China, Copyright 2009-2020 Shining 3D Tech, http://www.shining3d.com/fpages/en/camera/54/?gclid=CMOzjLPn7KECFVMB4wodn3DXJQ.
Notification of Transmittal of the International Search Report and the Written Opinion dated Jul. 20, 2010, International Application No. PCT/IB10/00002.
Toyama, Kentaro, et al., "Probabilistic Tracking in a Metric Space," Eighth International Conference on Computer Vision, Vancouver, Canada, vol. 2, Jul. 2001, 8 pages.
International Preliminary Report on Patentability dated Jul. 5, 2011, International Application No. PCT/IB2010/000002 filed Jan. 4, 2010.
Office Action dated Mar. 26, 2013, Chinese Patent Appl. No. 201080004036.7 filed Jan. 4, 2010.
Amendment dated Jul. 25, 2013, Chinese Patent Appl. No. 201080004036.7 filed Jan. 4, 2010.
Office Action dated Feb. 13, 2014, Russian Patent Appl. No. 2011127188 filed Jan. 4, 2010.
Office Action dated Mar. 20, 2013, U.S. Appl. No. 12/651,022, filed Dec. 31, 2009.
Amendment dated Sep. 19, 2013, U.S. Appl. No. 12/651,022, filed Dec. 31, 2009.
Notice of Allowance dated Oct. 21, 2013, U.S. Appl. No. 12/651,022, filed Dec. 31, 2009.
Supplemental Notice of Allowance dated Jan. 9, 2014, U.S. Appl. No. 12/651,022, filed Dec. 31, 2009.
Notice of Allowance dated Apr. 27, 2016 in Korean Patent Application No. 10-2011-7015411, filed Jan. 4, 2010, with English translation of the Allowance and the Allowed Claims, 9 pages.
English Abstract of JP2005309019 published Nov. 4, 2005, 1 page.
Oggier, Thierry, An All-Solid-State Optical Range Camera for 3D Real-Time Imaging with Sub-Centimeter Depth Resolution (SwissRangerTM), In Proceedings of the SPIE, vol. 5249, No. 65, 2003, 12 Pages.
R. Michalzik et al.: "Operating Principles of VCSELs" in: "Vertical-Cavity Surface-Emitting Laser Devices", Jan. 1, 2003, Springer Heidelberg, Berlin, Heidelberg, XP055270713, ISSN: 1437-0379, ISBN: 978-3-662-05263-1, vol. 6, pp. 53-98, DOI: 10.1007/978-3-662-05263-1_3.
B. Hawkins et al.: "Reliability of various size oxide aperture VCSELs" 52nd Electronic Components and Technology conference, 2002. Proceedings, May 28-31, 2002 pp. 540-550, XP010747681 , DOI:10.1109/ECTC.2002.1008148, ISBN: 978-0-7803-7430-0.
Arthur D'asaro et al: "High-Power, High-Efficiency VCSELs Pursue the Goal", Photonics Spectra, Feb. 1, 2005, XP055270715, http://www.photonics.com/Article.aspx?AID=21099.
Examination Report dated May 12, 2016 in European Patent Application No. 10726794.0, 7 pages.
"Second Office Action Received in Chinese Patent Application No. 201080004036.7", Mailed Date: Oct. 30, 2013, Filed Date: Jan. 4, 2010, 6 Pages.
"Notice of Allowance Received in Chinese Patent Application No. 2010800040367", Mailed Date: Dec. 5, 2013, Filed Date: Jan. 4, 2010, 4 Pages.
"Office Action Received in Japanese Patent Application No. 2011-544110", Mailed Date: Nov. 8, 2013, Filed Date: Jan. 4, 2010, 9 Pages.
"European Search Report Receive in European Patent Application No. 10726794.0", Mailed Date: Mar. 14, 2014, Filed Date: Jan. 4, 2010, 9 Pages.
European Search Report dated Apr. 1, 2014, European Patent Application No. 10726794.0.
Office Action dated Feb. 18, 2014, Russian Patent Application No. 2011127188.
Amendment dated Apr. 18, 2014, Russian Patent Application No. 2011127188.
"Office Action Received in Japanese Patent Application No. 2011-544110", Mailed Date: Mar. 3, 2014, Filed Date: Jan. 4, 2010.
Office Action dated Oct. 15, 2015 in Korean Patent Application No. 10-2011-7015411, filed Jan. 4, 2010, 6 pages.
Response to Office Action dated Dec. 15, 2015 in Korean Patent Application No. 10-2011-7015411, filed Jan. 4, 2010, with English Translation of the Claims, 6 pages.
Decision on Grant mailed Jul. 3, 2014, in Russian Patent Application No. 2011127188 filed Jan. 4, 2010.
Amendment dated Sep. 17, 2014, in European Patent Application No. 10726794.0 filed Jan. 4, 2010.
Amendment dated Dec. 3, 2014, in Korean Patent Application No. 10-2011-7015411 filed Jan. 4, 2010.

* cited by examiner

GATED 3D CAMERA

CLAIM OF PRIORITY

This application is a continuation of U.S. patent application Ser. No. 12/651,022, entitled "GATED 3D CAMERA," filed on Dec. 31, 2009 which claims the benefit of U.S. Provisional Application 61/142,361, entitled "GATED 3D CAMERA," filed on Jan. 4, 2009, incorporated herein by reference in their entirety.

FIELD

The technology relates to gated 3D cameras, and methods and apparatus for acquiring 3D images of a scene using a gated 3D camera.

BACKGROUND

Three-dimensional (3D) optical imaging systems, hereinafter referred to as "3D cameras", that are capable of providing distance measurements to objects and points on objects that they image, are used for many different applications. Among these applications are profile inspections of manufactured goods, CAD verification, robot vision, geographic surveying, and imaging objects selectively as a function of distance.

Some 3D cameras provide simultaneous measurements to substantially all points of objects in a scene they image. Generally, these 3D cameras comprise a light source, typically comprising an array of edge emitting laser diodes, which is controlled to provide pulses of light for illuminating a scene being imaged, and a gated imaging system for imaging light from the light pulses that is reflected from objects in the scene. The gated imaging system comprises a camera having a photosensitive surface, hereinafter referred to as a "photosurface", such as a CCD or CMOS photosurface and a gating means for gating the camera open and closed, such as an optical shutter or a gated image intensifier. The reflected light is registered on pixels of the photosurface of the camera only if it reaches the camera when the camera is gated open.

To image a scene and determine distances from the camera to objects in the scene, the light source is generally controlled to radiate a train of light pulses to illuminate the scene. For each radiated light pulse in the train, following an accurately determined delay from the time that the light pulse is radiated, the camera is gated open for a period hereinafter referred to as a "gate". Light from the light pulse that is reflected from an object in the scene is imaged on the photosurface of the camera if it reaches the camera during the gate. Since the time elapsed between radiating a light pulse and the gate that follows it is known, the time it took imaged light to travel from the light source to the reflecting object in the scene and back to the camera is known. The time elapsed is used to determine the distance to the object.

In some "gated" 3D cameras, only the timing between light pulses and gates is used to determine distance from the 3D camera to a point in the scene imaged on a pixel of the photosurface of the camera. In others, an amount of light registered by the pixel during the time that the camera is gated open is also used to determine the distance. The accuracy of measurements made with these 3D cameras is a function of the rise and fall times of the light pulses and their flatness, and how fast the cameras can be gated open and closed.

Gated 3D cameras and examples of their uses are found in European Patent EP1214609 and in U.S. Pat. Nos. 6,057,909, 6,091,905, 6,100,517, 6,327,073, 6,331,911, 6,445,884, and 6,794,628, the disclosures of which are incorporated herein by reference. A 3D camera using a pulsed source of illumination and a gated imaging system is described in "Design and Development of a Multi-detecting two Dimensional Ranging Sensor", Measurement Science and Technology 6 (September 1995), pages 1301-1308, by S. Christie, et al., and in "Range-gated Imaging for Near Field Target Identification", Yates et al, SPIE Vol. 2869, p 374-385 which are herein incorporated by reference. Another 3D camera is described in U.S. Pat. No. 5,081,530 to Medina, which is incorporated herein by reference. A 3D camera described in this patent registers energy in a pulse of light reflected from a target that reaches the camera's imaging system during each gate of a pair of gates. Distance to a target is determined from the ratio of the difference between the amounts of energy registered during each of the two gates to the sum of the amounts of energy registered during each of the two gates.

R&D efforts to enhance accuracy of measurements provided by 3D cameras, are typically invested in developing methods and devices for reducing rise times, fall times, and widths of light pulses transmitted to illuminate a scene and corresponding gates during which light reflected from the pulses by the scene is imaged.

SUMMARY

An aspect of some embodiments of the technology relates to providing an improved gated 3D camera.

An aspect of some embodiments of the technology, relates to providing a gated 3D camera having improved spatial accuracy with which features in a scene imaged by the camera are located.

An aspect of some embodiments of the technology relates to providing a gated 3D camera having an improved light source for illuminating scenes imaged by the camera.

An aspect of some embodiments of the technology, relates to providing a gated 3D camera having improved matching of a light source used to illuminate a scene imaged by the camera with a camera shutter that gates the camera photosurface on which light from the light source reflected by the scene is imaged.

According to an aspect of some embodiments of the technology, the light source comprises a VCSEL having a structure that is modified relative to typical VCSEL structures and is characterized by a relatively wide laser cavity.

The inventors have determined that accuracy of distances provided by a gated 3D camera is dependent on a convolution of a spectrum of the camera light source and a contrast ratio (CR) function of the camera shutter. The contrast ratio CR defines dependency of contrast ratio of the camera shutter on optical wavelength. For a given wavelength, CR is a ratio between a relatively high transparency of the shutter at the wavelength when the shutter is open, to a relatively low transparency of the shutter for light at the wavelength when the shutter is closed. Wavelengths for which the shutter can practically be used to shutter light are wavelengths for which its CR function is greater than one and, generally, substantially greater than one. A band of wavelengths for a shutter for which CR is greater than one is referred to as an "operating band" of the shutter.

For given rise times, fall times and widths of light pulses and gates, accuracy of distance measurements provided by a 3D gated camera can advantageously be improved by matching the shutter CR function and light source spectrum to maximize the convolution of the CR function and spectrum. Generally, matching a light source spectrum to a shutter substantially centers the spectrum in the operating band of the shutter. For convenience of presentation, the convolution between the shutter CR and the light source spectrum is referred to as a contrast intensity (CI). A normalized contrast intensity (CIN), the CI normalized to a total optical energy in a pulse of light provided by the light source, is conveniently used as a measure of a match between the light source and the shutter.

In general, periodic short-term changes in temperature of a gated 3D camera light source are generated relative to an ambient operating temperature of the camera during periods in which the light source is activated to illuminate a scene imaged by the camera. For conventional gated 3D camera light sources that typically comprise an edge emitting laser diode, the temperature changes cause wavelength shifts in the light source spectrum relative to the CR function of the camera shutter. Width of the spectrum relative to the CR operating band of the shutter is generally such that the wavelength shifts substantially misalign the spectrum and the CR function, reduce normalized contrast intensity CIN of the camera and increase thereby a bias error in distance measurements.

Whereas conventional light sources, such as vertical cavity surface emitting light emitting lasers (VCSELs), that are characterized by relatively narrow spectra are known, such light sources are typically used for low power applications such as communication systems. They generally do not produce sufficient amounts of light to make them advantageous for use in 3D gated cameras.

The inventors however have determined, that a VCSEL can be modified to increase its optical output by broadening its laser cavity. Whereas, broadening the VCSEL laser cavity causes width of the VCSEL spectrum to increase, the spectrum is still, generally, substantially narrower than that typically provided by conventional edge emitting laser diodes. Furthermore, wavelength shifts in the output spectrum of a VCSEL per degree change in temperature are substantially less than that of a conventional edge emitting laser diode. As a result, a light source comprising a modified VCSEL in accordance with an embodiment of the technology, for use in a gated 3D camera, provides relatively improved matching of the light source and the camera shutter. The modified VCSEL light source results in a CIN for the camera that is relatively large and relatively insensitive to temperature change of the light source. In an embodiment of the technology, the light source comprises an array of modified VCSELs.

There is therefore provided in accordance with an embodiment of the technology, a camera for determining distances to a scene, the camera comprising: a light source comprising a VCSEL controllable to illuminate the scene with a train of pulses of light having a characteristic spectrum; a photosurface; optics for imaging light reflected from the light pulses by the scene on the photosurface; and a shutter operable to gate the photosurface selectively on and off for light in the spectrum. Optionally, the characteristic spectrum has a FWHM width equal to or greater than about 1.5 nm. Optionally, the characteristic spectrum has a FWHM width equal to or greater than about 2.0 nm. Optionally, the characteristic spectrum has a FWHM width equal to or greater than about 2.5 nm.

In some embodiments of the technology, the VCSEL has a lasing cavity characterized by a diameter about equal to or greater than 20 microns. In some embodiments of the technology, the VCSEL has a lasing cavity characterized by a diameter about equal to or greater than 25 microns. In some embodiments of the technology, a normalized convolution of the shutter CR and characteristic spectrum is greater than or equal to about 10 for a temperature difference between the shutter and light source less than or equal to about 20° C. In some embodiments of the technology, a normalized convolution of the shutter CR and characteristic spectrum is greater than or equal to about 12 for a temperature difference between the shutter and light source less than or equal to about 20° C.

In some embodiments of the technology, the light source operates at a power level about equal to or greater than 12 Watts to illuminate the scene with the train of light pulses. Optionally, the power level is about equal to or greater than 15 Watts. Optionally, the power level is about equal to or greater than 18 Watts.

BRIEF DESCRIPTION OF FIGURES

Non-limiting examples of embodiments of the technology are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1:
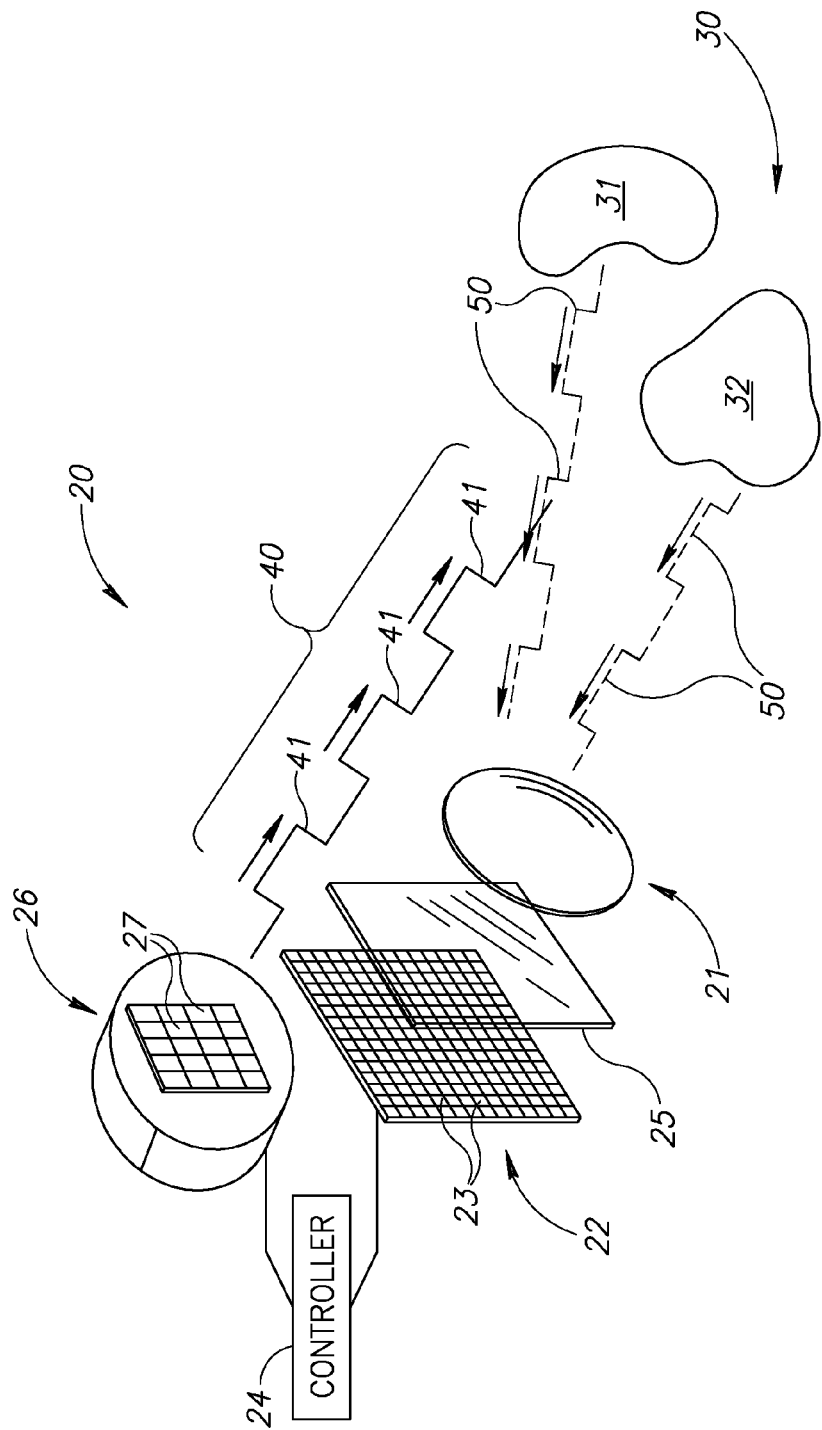
FIG. 1 schematically shows a 3D gated camera operating to determine distance to a scene in accordance with prior art.

FIG. 1 schematically illustrates a gated 3D camera 20 being used to acquire a 3D image of a scene 30 having objects schematically represented by objects 31 and 32.

Camera 20, which is represented very schematically, comprises a lens system, represented by a lens 21 and a photosurface 22 having pixels 23 on which the lens system images the scene. The camera comprises a shutter 25 for gating photosurface 22 on or off, which is controllable to selectively have low or high transmittance. Shutter 25 is said to be "closed" when it has low transmittance for light in its operating band and gates photosurface 22 off, and is said to be "open" when it has high transmittance for light in its operating band and gates the photosurface on. A "gate" refers to a period during which photosurface 22 is gated on by shutter 25 and the photosurface receives light transmitted through the shutter.

Camera 20 optionally comprises a light source 26, typically an array of edge emitter laser diodes 27 that are controllable to illuminate scene 30 with a train of transmitted pulses of light at wavelength in the shutter operating band. The light pulse train is schematically represented in FIG. 1 by a train 40 of hat pulses 41 each pulse associated with an overhead arrow leaving the light source 26. Optionally, the shutter operating band is an IR band of light. A controller 24 controls pulsing of light source 26 and operation of shutter 25 to gate photosurface 22. Function of light pulse train 40 and light pulses 41 in providing data for distance measurements to scene 30 are discussed below.

Typically, during operation of camera 20, light source 26 is controlled to repeatedly illuminate scene 30 with a train of light pulses 40. During each train 40 of light pulses, light source 26 generates and dissipates heat in the camera and the light source temperature cycles between a minimum and maximum temperature. Because of repeated cycles of heat generation and dissipation, shutter 25 is heated to an elevated operating temperature that is greater than the ambient temperature of the camera environment and is bracketed by the minimum and maximum light source temperatures. For an ambient temperature of about 30° C., the shutter operating temperature may be about 50° C., and the light source temperature may cycle from about 20° C. below to about 20° C. above the shutter operating temperature during generation of a light pulse train 40.

Since both an operating band of a shutter and a spectrum of a light source change with change in temperature at which they operate, during a light pulse train 40, as temperature of light source 26 varies relative to the operating temperature of shutter 25, the spectrum of light from the light source wavelength-shifts relative to the CR. As a result, the CIN of shutter 25 and light source 26 varies during each light pulse train. For reliable operation of camera 20 it is advantageous that CIN be maximized, and that variance of the CIN relative to its maximum that are caused by differences in operating temperatures of light source 26 and shutter 25 be relatively small. To this end, the light source and shutter are matched so that light from the light source is at wavelengths in the operating band of the shutter and generally, at least in a midpoint temperature of the light source heat cycle, the CIN of the camera is a maximum. Also, the light source and shutter are generally formed from a same semiconductor material so that they have similar temperature dependence.

Figure 2:
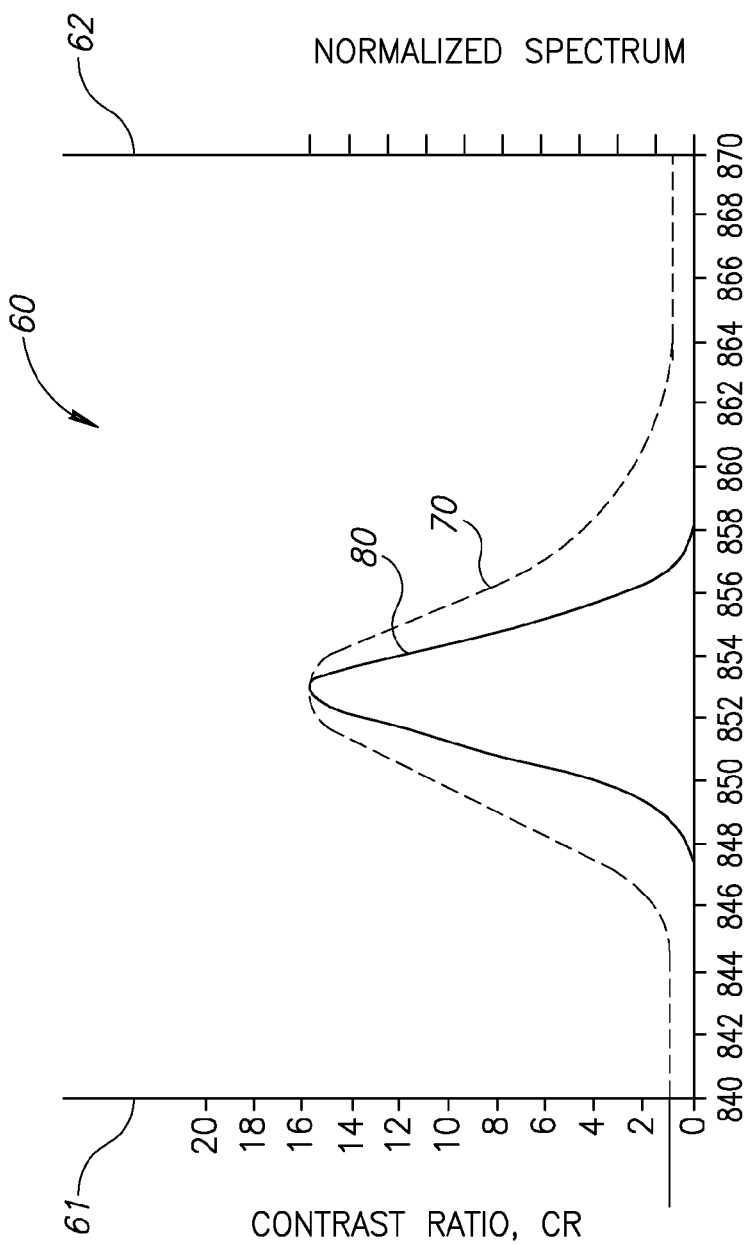
FIG. 2 shows a graph of a schematic CR function and spectrum for a shutter and a laser diode light source respectively comprised in the camera shown in FIG. 1, in accordance with prior art.

FIG. 2 shows a graph 60 of a schematic contrast ratio, i.e. CR, function 70, shown with a dashed line, for shutter 25 and a spectrum 80, shown in a solid line, for light source 26 comprising edge emitting laser diodes 27, as a function of wavelength. Both shutter 25 and laser diodes 27 are assumed to be made from GaAs and matched to have a maximum CIN optionally when operating at a same temperature of about 50° C. Wavelength is indicated along the abscissa of graph 60 and values for CR are indicted along a left-hand ordinate 61 of the graph. Spectrum 80 is normalized to its maximum, and relative values for the spectrum are indicated along a right hand ordinate 62 of the graph. Normalized contrast intensity, CIN, for the shutter CR 70 and light source spectrum 80 at 50° C. is equal to about 13.4. For GaAs, typically, spectrum 80 and CR function 70 shift by about 0.25 nm/° C.

To acquire a 3D image of scene 30 with camera 20 shown in FIG. 1, controller 24 controls light source 26 to illuminate scene 30 with a train 40 of light pulses 41, which pulses are assumed to have a pulse width τ. Light from each light pulse 41 is reflected by features in scene 30 and some of the reflected light is incident on camera 20 and collected by lens 21. Hat pulses 50 shown in dashed lines and associated with overhead arrows pointing toward camera 22 in FIG. 1 schematically represent reflected light from transmitted pulses 41 that reaches camera 20. Following emission of each at least one light pulse 41, controller 24 controls shutter 25 to gate on photosurface 22 at a suitable time relative to a time at which the light pulse is emitted to receive and image on the photosurface light 50 reflected from the transmitted light pulse that is collected by lens 21. Amounts of light 50 imaged on pixels 23 of the photosurface during gates of camera 20 are used to determine distances to features of scene 30 that are imaged on the pixels and provide thereby a 3D image of the scene.

Figure 3:
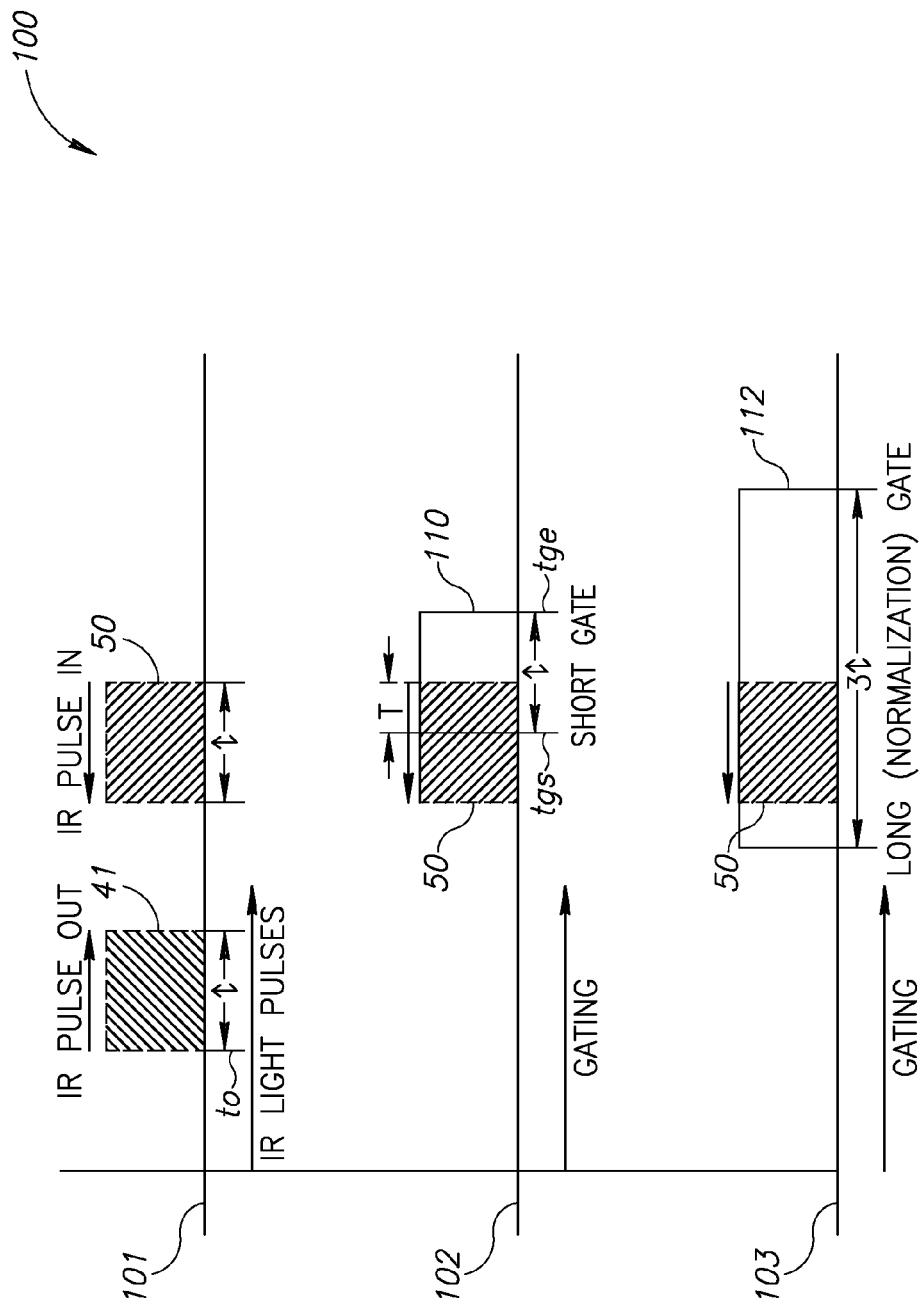
FIG. 3 shows a graph of time lines illustrating gating of a 3D camera, in accordance with prior art.

Various methods of gating a 3D camera and acquiring distances to features in scene 30 are described in the patents referenced above and in PCT Patent application PCT/IL2007/001571, the disclosure of which is incorporated herein by reference. FIG. 3 shows a graph 100 of time lines 101, 102 and 103, which illustrate illuminating scene 30 with train 40 of light pulses 41 and gating of photosurface 22 by shutter 25 to acquire distances to features in the scene, in accordance with a relatively simple gating scheme. Time lines 101, 102 and 103 graphically illustrate timing of gates of shutter 25 relative to a radiation time $t_o$, of an arbitrary light pulse 41 in train 40 of pulses radiated by light source 26 to illuminate scene 30. The single light pulse is represented by a shaded hat pulse 41 with overhead arrow pointing to the right along time line 101. Time lines 102 and 103 graphically show gates of shutter 25. The gating profile illustrated in FIG. 3 is typically repeated for each pulse 41 in pulse train 40.

Let a given feature in scene 30 that is imaged on a corresponding pixel 23 (FIG. 1) in photosurface 22 be located at a distance $D_f$ from camera 20. Photons in a light pulse 50 reflected by the given feature from radiated light pulse 41 first reach camera 20 at a time, $t_{γ1}(D_f)$, that is dependent on the distance $D_f$. Reflected light pulse 50 has a same width, τ, as radiated light pulse 41, and a last photon in reflected light pulse 50 reaches the camera from the given feature at a time $t_{γ2}(D_f)=t_{γ1}(D_f)+τ$. Reflected light pulse 50 is represented along time lines 101, 102 and 103 by a shaded hat pulse 50 shown in dashed lines with an overhead arrow pointing to the left along the time lines.

A hat pulse 110 along time line 102 schematically represents a gate, hereinafter a "timing gate 110", during which controller 24 (FIG. 1) controls shutter 25 to gate on photosurface 22 and register light that reaches camera 20. Timing gate 110 is, optionally, relatively short and has a gate width equal to τ, starts at a time $t_{gs}$ following $t_o$ and ends at a time $t_{ge}=(t_{gs}+τ)$. Reflected pulse 50 is shown along time line 102 for convenience to show clearly a temporal relation between reflected pulse 50 and timing gate 110. Reflected pulse 50 overlaps timing gate 110 for a time-portion, T, of the gate. Assume that during time T pixel 23 (FIG. 1) that images the given feature registers an amount, "Q", of charge responsive to light from the given feature that is incident on the pixel. Assume further that if reflected pulse 50 were temporally congruent with gate 110 (i.e. if a first photon and a last photon in the reflected pulse were to reach camera 20 at times $t_{gs}$ and $t_{ge}$ respectively) the pixel imaging the given feature would register a total amount, "$Q_o$", of light. Then $T = \tau Q/Q_o$ and if c represents the speed of light, distance $D_f$ of the feature from camera 20 may be given by the following expressions:

$$D_f = (c/2)[t_{gs} - (\tau)(1 - Q/Q_o)] \text{ if } t_{gs} \leq t_{\gamma 2}(D_f) \leq t_{ge}; \text{ and} \quad (1)$$

$$D_f = (c/2)[t_{gs} + (\tau)(1 - Q/Q_o)] \text{ if } t_{gs} \leq (D_f) \leq t_{ge}. \quad (2)$$

From equations (1) and (2) it is noted that for gate 110 having start and end times $t_{gs}$ and $t_{ge}$ respectively, distances are provided for features in scene 30 located in an "imaging slice" of the scene of width $c\tau$ centered at a distance $(c/2)t_{gs}$ from camera 20.

For convenience of presentation, let the distance $(c/2)t_{gs}$ of the center of an imaging slice be represented by "$D_C$", and a distance, $(c/2)t_{gs}(1 - Q/Q_o)$, that is subtracted or added respectively in equations (1) and (2) to $D_C$ to provide $D_f$ for a feature is represented by $\Delta D_f$. Then equations (1) and (2) may be written:

$$D_f = D_C \Delta D_f \text{ if } t_{gs} \leq t_{\gamma 2}(D_f) \leq t_{ge}; \text{ and} \quad (3)$$

$$D_f = (c/2)[t_{gs} + (\tau)(1 - Q/Q_o)] \text{ if } t_{gs} \leq t_{\gamma 1}(D_f) \leq t_{ge}. \quad (4)$$

Optionally, $Q_o$ is determined by gating camera 20 on for a relatively long gate, hereinafter a "normalization gate", which is represented by a hat pulse 112 along time line 103. Gate 112 optionally has a gate width equal to $3\tau$ and begins at a time $(t_{gs}-\tau)$ following transmission time $t_o$ of a pulse 41, in the train 40 of light pulses. The width and timing of the normalization gate are determined so that for every feature in scene 30 for which light is registered on a pixel of photosurface 22 during timing gate 110, normalization gate 112 will provide a value for $Q_o$. A reflected pulse 50, reflected by the given feature at distance $D_f$ from camera 20 is shown along time line 103 to show relative timing of the reflected pulse and normalization gate 112. The reflected pulse falls completely within the temporal boundaries of normalization gate 112 and all the light in the reflected pulse is registered by the pixel and provides a measure of $Q_o$. It is noted that camera 20 may be gated on for timing and normalization gates 110 and 112 responsive to times at which different light pulses 41 are radiated and therefore register light from different reflected light pulses 50.

There are various ways to determine which equations (1) or (2) to apply for a given reflected pulse 50. For example, timing gate 110 may optionally be divided into two contiguous gates, a "front" gate and a "back" gate, each having a gate width equal to $\tau/2$. If a pixel registers a greater amount of light during the front gate or back gate, then for the feature of scene 30 that is imaged on the pixel equations (1) or (2) respectively apply.

Equations (1) and (2) assume that the CR for light provided by light source 26 is infinite and when shutter 25 is closed, no light from light source 26 is transmitted through the shutter to reach photosurface 22. However, as discussed above and shown in FIG. 2, CR for shutter 25 is finite, and by way of example, in FIG. 2, CR has a maximum value of about 16. As a result, light in reflected light pulses 50 from a feature in scene 30 that reaches camera 20 when the shutter is closed leaks through the shutter and "contaminates" values of Q registered by a pixel in photosurface 22 that images the feature. The contamination in general generates an error in the distance $D_f$ determined for the feature by equation (1) or (2) and the error increases as CR decreases.

For example, as noted above, $(\tau)Q/Q_o$ is duration of overlap time, T, during which photons in a reflected pulse 50 from a given feature in scene 30 reaches camera 20 during timing gate 110 and shutter 25 has maximum transparency. A period $(\tau)(1-Q/Q_o)$ is therefore a duration of time that photons reach the camera from the reflected pulse when shutter 25 is off and the shutter has transparency reduced from the maximum by a factor 1/CR.

Let a total amount of light collected by a pixel 23 that images the given feature with light from a pulse 50 during timing gate 110 be represented by $Q^*$. $Q^*$ can reasonably accurately be estimated in accordance with an expression, $$Q^* = Q + [Q_o/\text{CIN}](1 - Q/Q_o), \quad (5)$$

where CIN is the normalized contrast intensity CI for the CR of shutter 25 and spectrum of reflected light pulse 50.

Let $D_f^*$ represent distance determined for the given feature using the amount of light $Q^*$ registered by the pixel that images the given feature. Then equations (1) and (2) give $$D_f^* = (c/2)[tg_s - (\tau)(1 - [Q + [Q_o/\text{CIN}](1 - Q/Q_o)]/Q_o)] \text{ if } tg_s \leq t_{\gamma 2} \leq tg_e; \text{ and} \quad (6)$$

$$D_f^* = (c/2)[tg_s + (\tau)(1 - [Q + [Q_o/\text{CIN}](1 - Q/Q_o)]/Q_o)] \text{ if } tg_s \leq t_{\gamma 1} \leq tg_e. \quad (7)$$

Or $$D_f^* = D_C - \Delta D_f + (c/2)(\tau)(1 - Q/Q_o)/\text{CIN})] \text{ if } tg_s \leq t_{\gamma 2} \leq tg_e; \text{ and} \quad (8)$$

$$D_f^* = D_C + \Delta D_f - (c/2)(\tau)(1 - Q/Q_o)/\text{CIN})] \text{ if } tg_s \leq t_{\gamma 1} \leq tg_e. \quad (9)$$

Equations (8) and (9) indicate that for features in the imaging slice associated with timing gate 110, distance to a given feature determined from charge registered by a pixel 23 that images the feature is erroneously biased towards the center of the imaging slice by a bias error, "$\delta D$" having magnitude, $$\delta D = (c/2)(\tau)/\text{CIN})(1 - Q/Q_o), \quad (10)$$

In equation (10), Q is an amount of charge that would be registered by the pixel imaging the feature were CR of shutter 25 equal to infinity.

Whereas determined distances $D_f^*$ can generally be corrected for CR and therefore CIN, being finite, it can be difficult to make such corrections accurately because, as noted above, when light source 26 radiates a train 40 (FIG. 1) of light pulses 41, the light source undergoes local cyclical heating with each pulse it radiates. The local heating generates cyclical temperature differences between a temperature at which light source 26 operates and an operating temperature at which shutter 25 operates. The temperature difference can be as much as 20° C. As a result, spectrum 80 shown in FIG. 2 can shift by as much as 5 nm during operation of camera 20 to determine distances to features in scene 30. The shift with temperature difference can result in a substantial decrease in CIN of shutter 25 and a concomitant increase in bias error $\delta D$.

Figure 4:
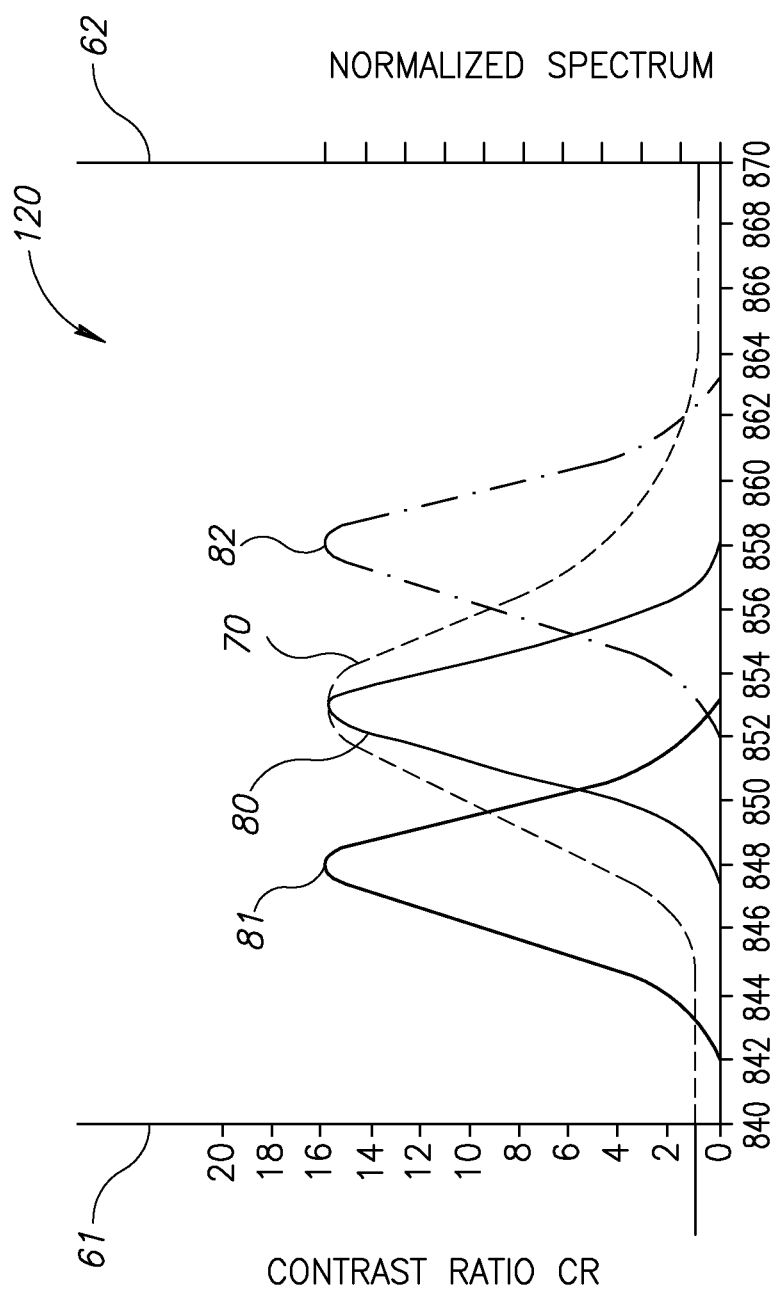
FIG. 4 shows a graph that illustrates wavelength shifts of the spectrum of the laser diode light source relative to the CR function of the shutter shown in FIG. 1 that results from local heating of the light source, in accordance with prior art.

By way of example, FIG. 4 shows a graph 120 of CR function 70 for shutter 25 and spectrum 80 of light source shown in graph 60 (FIG. 2) for camera 20 operating at an operating temperature of 50° C. and spectra 81 and 82 for the light source that are shifted by local heating resulting from operation of the light source. Spectra 81 and 82 are assumed to prevail at temperatures of 30° C. and 70° C. respectively. From graph 120, it is readily seen by noting amounts by which spectra curves 81 and 82 overlap CR curve 70, that CIN for spectra 81 and 82 are substantially reduced relative to a maximum CIN, which occurs for spectra 80. CIN has values equal of about 13.4, 6, and 5, for spectra 80, 81, and 82 respectively.

Figure 5:
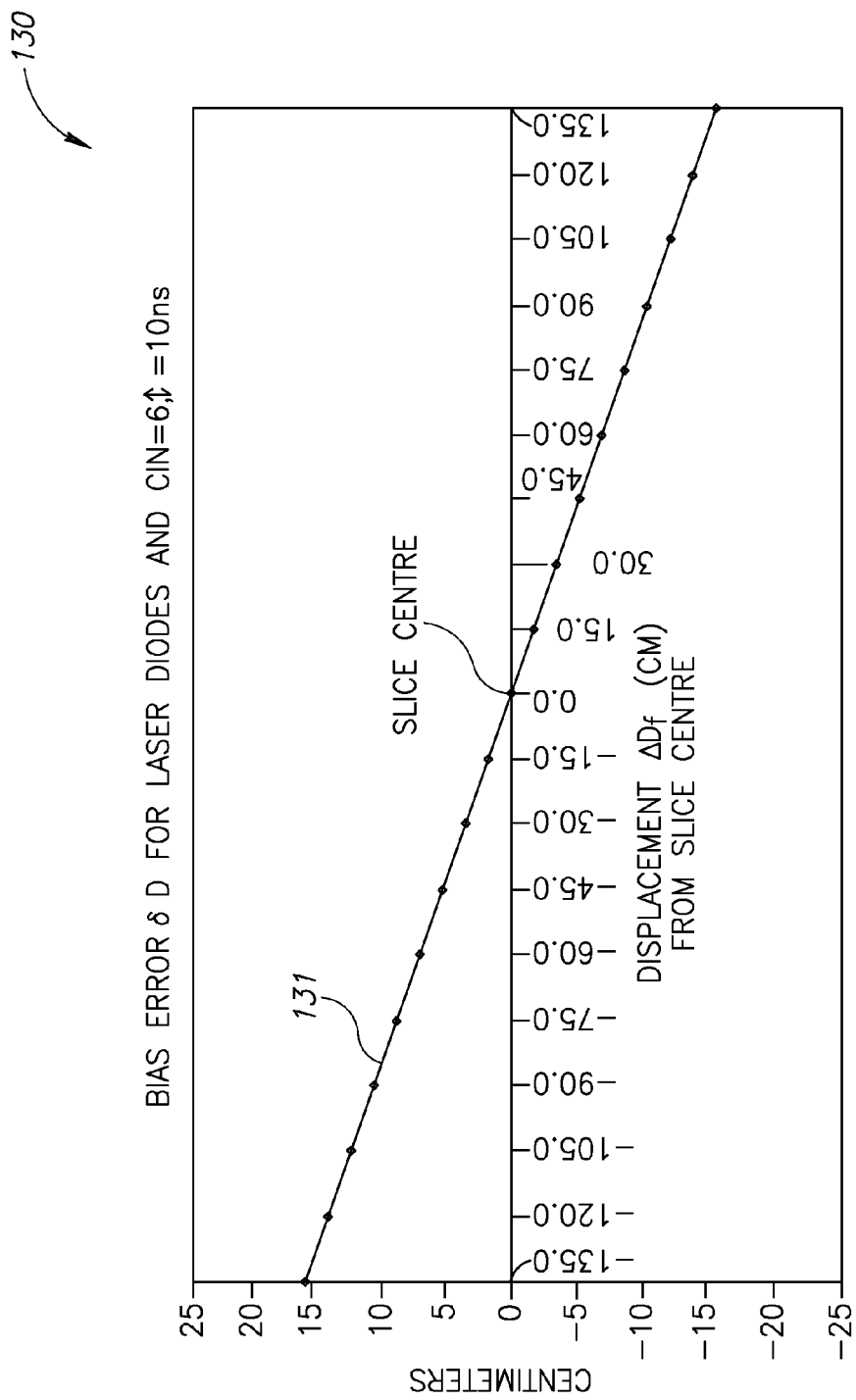
FIG. 5 shows a graph of a bias error in distance measurements to the scene provided by the camera shown in FIG. 1, in accordance with prior art.

FIG. 5 shows a graph 130 of a bias error δD in distance to a given feature of scene 30 that could be generated assuming a CIN equal to about 6, i.e. a CIN that might occur for a temperature difference between light source 26 and shutter 25 equal to about 20° C. Graph 130 assumes a pulse width τ for light pulse 41 (FIG. 1 and FIG. 3) equal to 10 ns and a gate width for gate 110 (FIG. 3) equal to the pulse width. An imaging slice of scene 30 therefore has a width equal to about 2.7 m. In graph 130, a curve 131 shows δD as a function of displacement $\Delta D_f$ from the center of the imaging slice. From the graph, it is seen that the error bias δD is substantially equal to zero for features at the center of the imaging slice, grows linearly with distance from the slice center, and is equal to about 17% of $\Delta D_f$.

In accordance with an embodiment of the technology, a gated 3D camera comprises a light source having an array of VCSELs that provides improved matching of the light source to the camera shutter and reduce δD. VCSELs have relatively narrow spectra that are substantially less sensitive to temperature changes than the spectra of laser diodes. A typical edge emitting laser diode may have a spectrum that is about 4 nm (FWHM) wide, and as noted above, may exhibit a spectrum shift by about 0.25 nm/° C. A typical VCSEL on the other hand typically has a spectrum between about 0.5 nm and 1 nm wide that shifts by about 0.07 nm/° C. However, VCSELs, which are typically used for relatively low energy communication applications, do not in general provide sufficient optical energy for use in a light source of a gated 3D camera.

VCSELs in a light source, in accordance with an embodiment of the technology, are modified to increase their optical energy output by broadening their laser cavities. Whereas, broadening the laser cavity of a VCSEL causes the width of the spectrum of the VCSEL to increase, the spectrum is still generally substantially narrower than that typically provided by a conventional edge emitting laser diode. As a result, modified VCSELs in a light source in accordance with an embodiment of the technology, provide both sufficient power for advantageous use in a gated 3D camera and improved matching to the camera shutter.

Conventional VCSELs typically have laser cavity cross sections of diameter about equal to or less than 15 microns. Optionally, VCSELS in a gated 3D camera light source in accordance with an embodiment of the technology comprise a relatively large laser cavity having a cross section characterized by a width, e.g. a diameter, greater than or about equal to 20 microns. Optionally, the VCSEL laser cavity width is greater than or about equal to 25 microns. Optionally, the width of the spectrum is greater than or about equal to 2.5 nm. In some embodiments of the technology the spectrum width is greater than or about equal to 3 nm.

Figure 6:
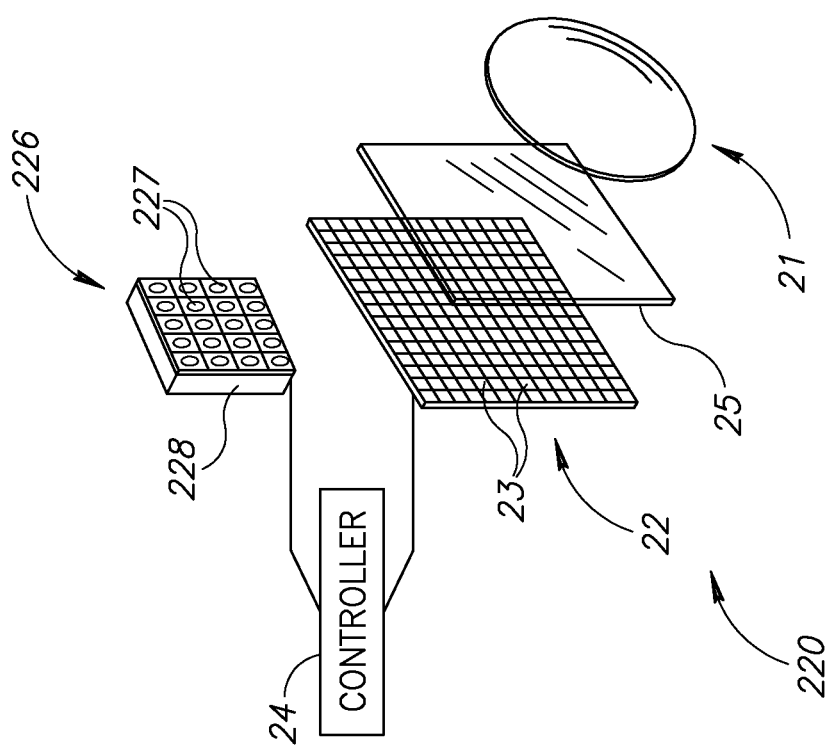
FIG. 6 schematically shows a 3D gated camera comprising a VCSEL light source, in accordance with an embodiment of the technology.

FIG. 6 schematically shows a gated 3D camera 220 that has a light source 226 comprising VCSELs 227, in accordance with an embodiment of the technology. Gated 3D camera 220 is, by way of example, similar to gated 3D camera 20 shown in FIG. 1 except for light source 226, which comprises VCSELs 227 rather than laser diodes 27. VCSELs 227 have relatively large laser cavities characterized by, optionally circular, cross sections of diameter equal to about 20 microns. Optionally, the VCSELs are operable to generate IR light characterized by a spectrum having FWHM between about 2.5 nm to about 3 nm centered at a wavelength of about 855 nm when operated at 50° C.

In light source 226, by way of example, VCSELS 227 are configured in a rectangular array of 16 rows and 16 columns with a pitch of about 55 microns that is mounted to a suitable heat dissipating package 228. Any of various packages known in the art may be adapted and used in the practice of the technology for dissipating heat generated by VCSELs 227 during their operation. The inventors have determined that light source 226 comprising VCSELs 227 and suitable heat dissipating package 228 can be operated at a power level about equal to or greater than 12 Watts to generate a train of light pulses suitable for illuminating a scene for determining distances to the scene. In some embodiments of the technology, the camera is configured so that the light source may be operated at a power level about equal to or greater than 15 Watts. In some embodiments of the technology, the power level is about equal to or greater than 18 Watts.

For temperature differences between light source 226 and shutter 25 produced during operation of the light source to provide a train of light pulses, the spectrum of light provided by the light source exhibits relatively small wavelength shifts and relatively large values for CIN. As a result, camera 220, in accordance with an embodiment of the technology can provide distance measurements for a scene with substantially smaller bias errors δD than the bias errors shown in FIG. 4 for camera 20 (FIG. 1).

Figure 7:
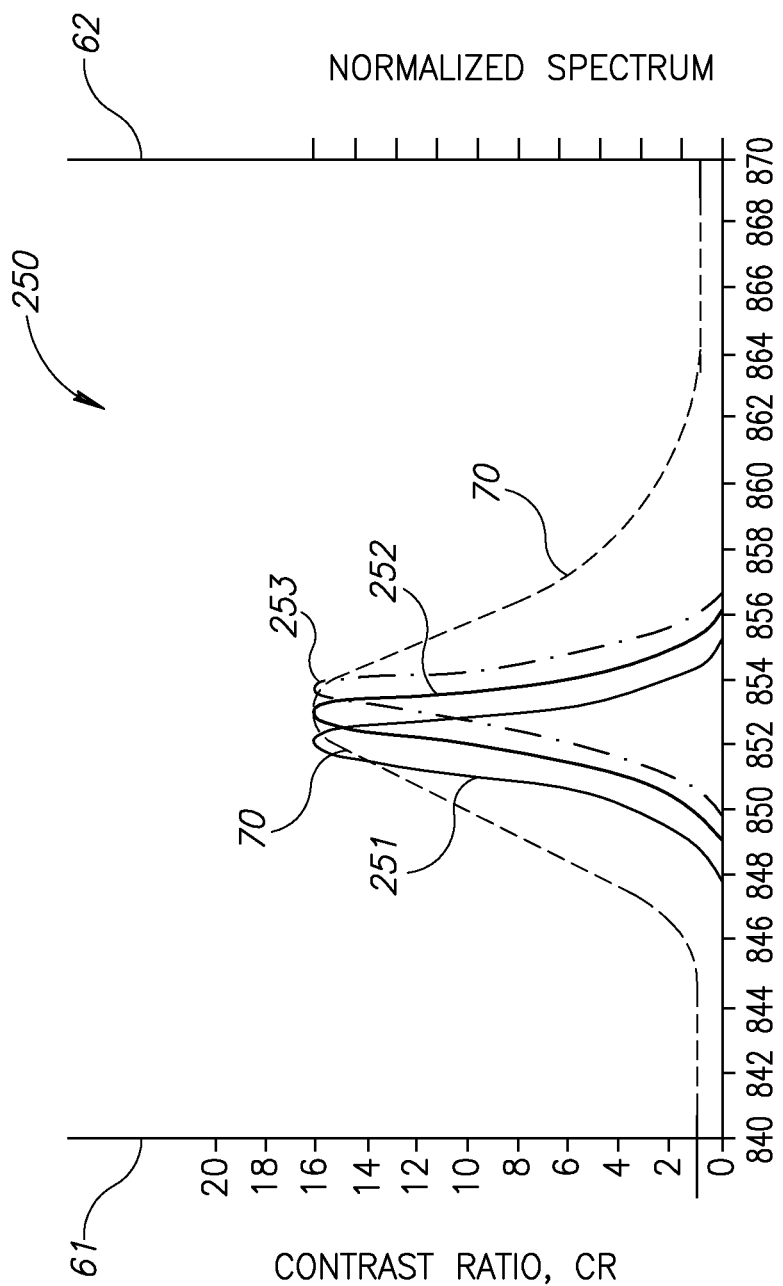
FIG. 7 shows a graph that illustrates wavelength shifts of the spectrum of the VCSEL light source of the camera shown in FIG. 6 that results from local heating of the light source, in accordance with an embodiment of the technology.

FIG. 7 shows a graph 250 of spectra 251, 252, and 253 for VCSELs 227 formed from GaAs for temperatures 30° C., 50° C., and 70° C. and CR curve 70 for shutter 25 at 50° C. shown in graph 120 of FIG. 4. From graph 250 it is seen that for temperature differences of 20° C. that can be generated between light source 226 and shutter 25 during operation of the light source, the spectra shift by relatively small amounts relative to CR curve 70. Assuming that for each degree centigrade in operating temperature of VCSEL 227 (FIG. 6), the VCSEL spectrum shifts by 0.07 nm, spectra 251 and 253 are shifted by about 1.4 nm relative to CR curve 70. The shifts of spectra 251 and 253 relative to CR curve 70 that are exhibited by light source 226 are substantially smaller than those exhibited for the same temperature differences by spectra 81 and 82 respectively of light source 26 shown in FIG. 4. The CIN values for shifted spectra 251 and 253 for VCSELs 227 and CR curve 70 are also substantially larger than those of corresponding spectra 80 and 82 for laser diode light source 26.

CIN values for spectra 251, 252 and 253 for light source 226 and CR curve 70 are estimated to be equal to about 12.5, 13.8, and 12.7 respectively. The CIN values for VCSEL light source 226 at about 30° C. or about 70° C. when shutter 25 is at about 50° C. are larger by more than a factor of about 2 than those for laser diode light source 26 at temperatures of about 30° C. or about 70° C. when shutter 25 is at about 50° C. Ratios of CIN values for VCSEL light source spectra 251 and 253 relative to laser diode light source spectra 81 and 82 respectively are large because the VCSEL spectra are relatively narrow, and for a same temperature difference relative to temperature of shutter 25, they are shifted by substantially smaller amounts than the spectra of laser diodes.

Figure 8:
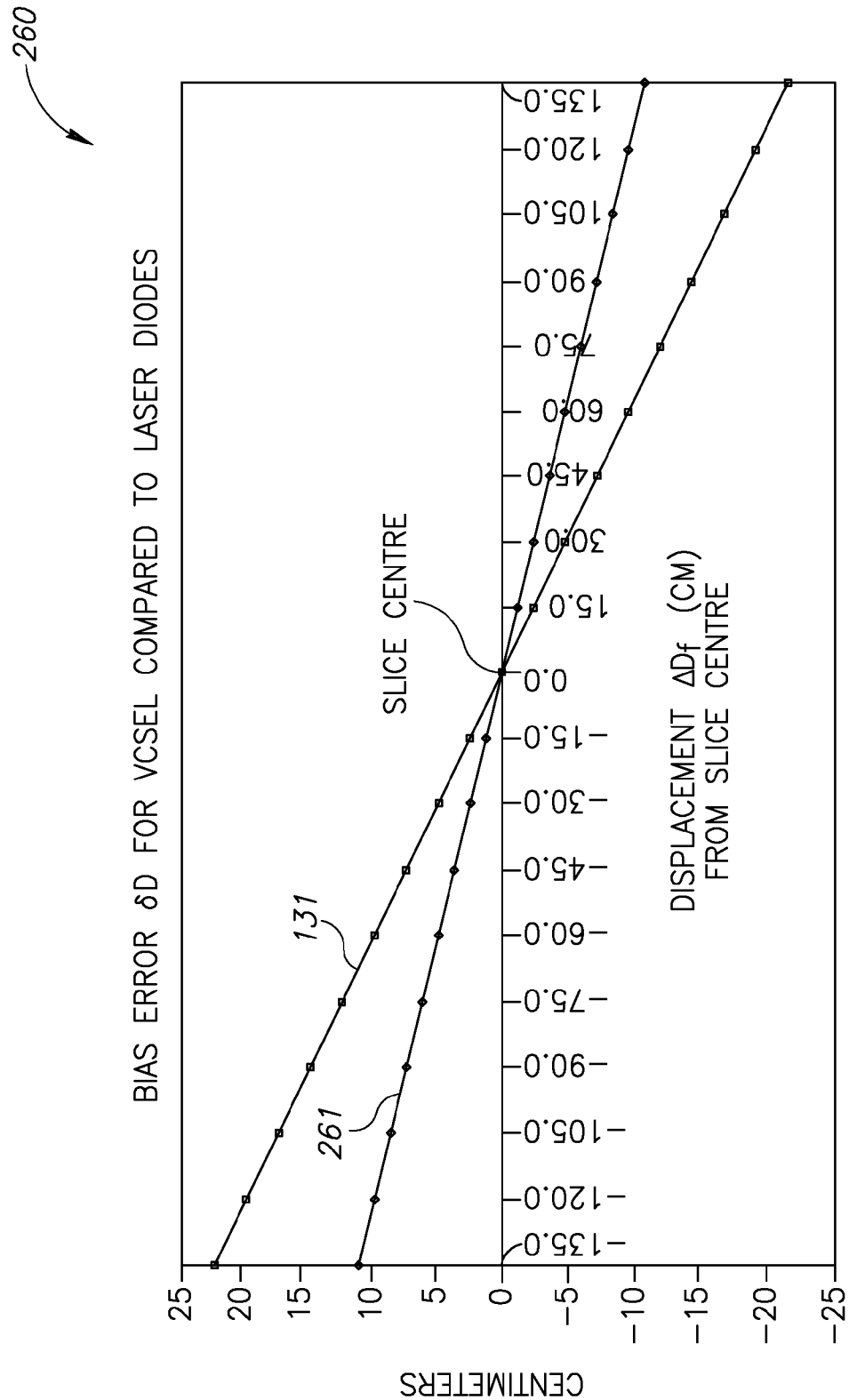
FIG. 8 shows a graph that illustrates improvement of a bias error in distance measurements to a scene provided by the camera shown in FIG. 6, in accordance with an embodiment of the technology.

FIG. 8 illustrates advantageous improvements in bias errors δD that can be provided by VCSEL light source 226 and camera 220, in accordance with an embodiment of the technology. FIG. 8 shows a graph 260 that is identical to graph 130 shown in FIG. 5 with an addition of a δD curve 261 that shows δD as a function of $\Delta D_f$ for 3D camera 220, comprising VCSEL light source 226, in accordance with an embodiment of the technology. Curve 261 assumes a same temperature difference of 20° C. between VCSEL light source 226 and shutter 25 as is assumed for δD curve 131 between laser diode light source 26 and shutter 25. Graph 260 shows that δD for 3D camera 220 is substantially smaller than that for 3D camera 20 and is about half of that for 3D camera 20. Whereas bias error δD is equal to about 17% of $\Delta D_f$ for laser diode light source 26 and camera 20 the bias error is reduced by about ½ and is equal to about 8% of $\Delta D_f$ for VCSEL light source 226 and camera 220, in accordance with an embodiment of the technology.

In the description and claims of the application, each of the words "comprise" "include" and "have", and forms thereof, are not necessarily limited to members in a list with which the words may be associated.

The technology has been described using various detailed descriptions of embodiments thereof that are provided by way of example and are not intended to limit the scope of the technology. The described embodiments may comprise different features, not all of which are required in all embodiments of the technology. Some embodiments of the technology utilize only some of the features or possible combinations of the features. Variations of embodiments of the technology that are described and embodiments of the technology comprising different combinations of features noted in the described embodiments will occur to persons with skill in the art. It is intended that the scope of the technology be limited only by the claims and that the claims be interpreted to include all such variations and combinations.

The invention claimed is:

1. A camera for determining distances to objects in a three-dimensional (3D) scene, the camera comprising:
    a light source controllable to illuminate the 3D scene with trains of pulses of light, the light source having a predetermined operating temperature range and a characteristic spectrum that shifts with temperature;
    a photosurface;
    optics for imaging light reflected from the trains of light pulses by the objects in the 3D scene on the photosurface; and
    a shutter operable to gate the photosurface selectively on and off to capture the imaged light, wherein the shutter has a contrast ratio (CR) that is matched over the operating temperature range of the light source with the temperature shifted characteristic spectrum of the light source so that light from the light source is at wavelengths in a peaking portion of an operating band of the shutter over the operating temperature range of the light source.

2. The camera according to claim 1 wherein the CR of the shutter has a peak at least in a midpoint temperature of the operating temperature range of the light source such that a normalized contrast intensity of the camera is a maximum at the midpoint temperature.

3. The camera of claim 1 wherein bias error resulting from a temperature difference between the light source and the shutter is less than about 10 percent of the displacement of an imaging slice of the scene.

4. The camera of claim 1 wherein the light source comprises at least one vertical cavity surface emitting light emitting laser (VCSEL).

5. The camera of claim 4 wherein the laser and the shutter are manufactured from GaAs.

6. The camera of claim 1 wherein the wherein the light source and shutter are matched so that light from the light source is at wavelengths in an operating band of the shutter when the shutter is operating at a temperature of about 50° C.

7. The camera of claim 4 wherein the light source has a characteristic spectrum with a FWHM width equal to or greater than about 1.5 nm.

8. The camera of claim 4 wherein the VCSEL has a lasing cavity characterized by a diameter about equal to or greater than 20 microns.

9. A camera of claim 1 wherein a normalized convolution of shutter contrast ratio (CR) and characteristic spectrum is greater than or equal to about 10 for a temperature difference between the shutter and light source less than or equal to about 20 degrees C.

10. A camera of claim 1 wherein the light source operates at a power level about equal to or greater than 12 Watts to illuminate the scene with the train of light pulses.

11. A camera for determining distances to a scene, the camera comprising:
    a light source comprising at least one vertical cavity surface emitting light emitting laser (VCSEL) controllable to illuminate the scene with a train of pulses of light having a characteristic spectrum;
    a photosurface;
    optics for imaging light reflected from the light pulses by the scene on the photosurface; and
    a shutter operable to gate the photosurface selectively on and off for light in spectrum wherein, at least in a midpoint temperature of a light source heat cycle, the CIN of the camera is a maximum.

12. The camera of claim 11 wherein the shutter is operable to gate the photosurface selectively on and off for light in the spectrum wherein the light source and shutter are matched so that light from the light source is at wavelengths in an operating band of the shutter.

13. The camera of claim 12 wherein a normalized convolution of shutter contrast ratio (CR) and characteristic spectrum is greater than or equal to about 10 for a temperature difference between the shutter and light source less than or equal to about 20° C.

14. The camera of claim 11 wherein the laser and the shutter are manufactured from GaAs.

15. The camera of claim 11 wherein the light source and shutter are matched so that light from the light source is at wavelengths in an operating band of the shutter when operating at a temperature of about 50° C.

16. The camera of claim 13 wherein the light source has a characteristic spectrum with a FWHM width equal to or greater than about 1.5 nm.

17. The camera of claim 12 wherein the VCSEL has a lasing cavity characterized by a diameter about equal to or greater than 20 microns.

18. A camera for determining distances to a scene, the camera comprising:
    a light source having an array of VCSELs providing improved matching of the light source to the camera shutter and being controllable to illuminate the scene with a train of pulses of light having a characteristic spectrum, the light source has a characteristic spectrum with a FWHM width equal to or greater than about 1.5 nm, and a lasing cavity characterized by a diameter about equal to or greater than 20 microns;
    a controller coupled to the light source;
    a photosurface comprising a CCD or CMOS photosensitive surface;
    a lens system for imaging light reflected from the light pulses by the scene on the photosurface; and a shutter operable to gate the photosurface selectively on and off for light in the spectrum;

a shutter operable to gate the photosurface selectively on and off for light in the spectrum wherein the light source and shutter are matched so that light from the light source is at wavelengths in an operating band of the shutter and wherein, at least in a midpoint temperature of a light source heat cycle, the CIN of the camera is a maximum.

19. The camera of claim 18 wherein bias error resulting from a temperature difference between the light source and the shutter is less than about 10 percent of the displacement of an imaging slice of the scene.

20. The camera of claim 19 wherein a normalized convolution of shutter contrast ratio (CR) and characteristic spectrum is greater than or equal to about 10 for a temperature difference between the shutter and light source less than or equal to about 20° C.

* * * * *